United States Patent
Gasper et al.

(12) United States Patent (10) Patent No.: US 7,340,415 B1
(45) Date of Patent: Mar. 4, 2008

(54) ADAPTIVE, PREDICTIVE SYSTEM FOR REPLENISHING CURRENCY IN ATMS

(75) Inventors: David A. Gasper, Beavercreek, OH (US); Mel Walter, Wildwood, MO (US)

(73) Assignee: NCR Corporation, Dayton, OH (US)

( * ) Notice: Subject to any disclaimer, the term of this patent is extended or adjusted under 35 U.S.C. 154(b) by 1508 days.

(21) Appl. No.: 09/651,983

(22) Filed: Aug. 31, 2000

(51) Int. Cl.
G06Q 30/00 (2006.01)
(52) U.S. Cl. .......................................... 705/26; 705/43
(58) Field of Classification Search ............ 705/30–43, 705/26, 70
See application file for complete search history.

(56) References Cited

U.S. PATENT DOCUMENTS

| | | | |
|---|---|---|---|
| 5,945,602 A * | 8/1999 | Ross | 73/570 |
| 6,014,649 A * | 1/2000 | Kobayashi et al. | 705/43 |
| 6,230,928 B1 * | 5/2001 | Hanna et al. | 221/13 |
| 6,378,770 B1 * | 4/2002 | Clark et al. | 235/379 |
| 6,607,124 B1 * | 8/2003 | Junkins et al. | 235/379 |

* cited by examiner

*Primary Examiner*—Frantzy Poinvil
(74) *Attorney, Agent, or Firm*—Gregory A. Welte (57) ABSTRACT

A method of operating Automated Teller Machines, ATMs. An ATM dispenses currency, thereby depleting its supply, and requiring replenishment. Replenishment currently involves humans who (1) measure the currency content of an ATM, (2) compute an amount to be replenished, and (3) report the amounts replenished, when replenishment occurs. These human actions are error-prone. The invention eliminates all three steps. Under the invention, no actual measurement is made of currency content, for replenishment purposes. Instead, the content is estimated. Then, the estimate is used to compute an amount for replenishment. Replenishment occurs, but the fact of replenishment is inferred from signals received from the ATM, and not from a report from a human.

9 Claims, 9 Drawing Sheets

ADAPTIVE, PREDICTIVE SYSTEM FOR REPLENISHING CURRENCY IN ATMS

The invention relates to a system for replenishing the currency supplies within Automated Teller Machines (ATMs), and which (1) does not require the service teams which perform the replenishment to actively report either the amounts of replenishment, or the fact that replenishment occurred, and (2) uses the ATMs to track the performance of the service teams.

BACKGROUND OF THE INVENTION

Figure 1:
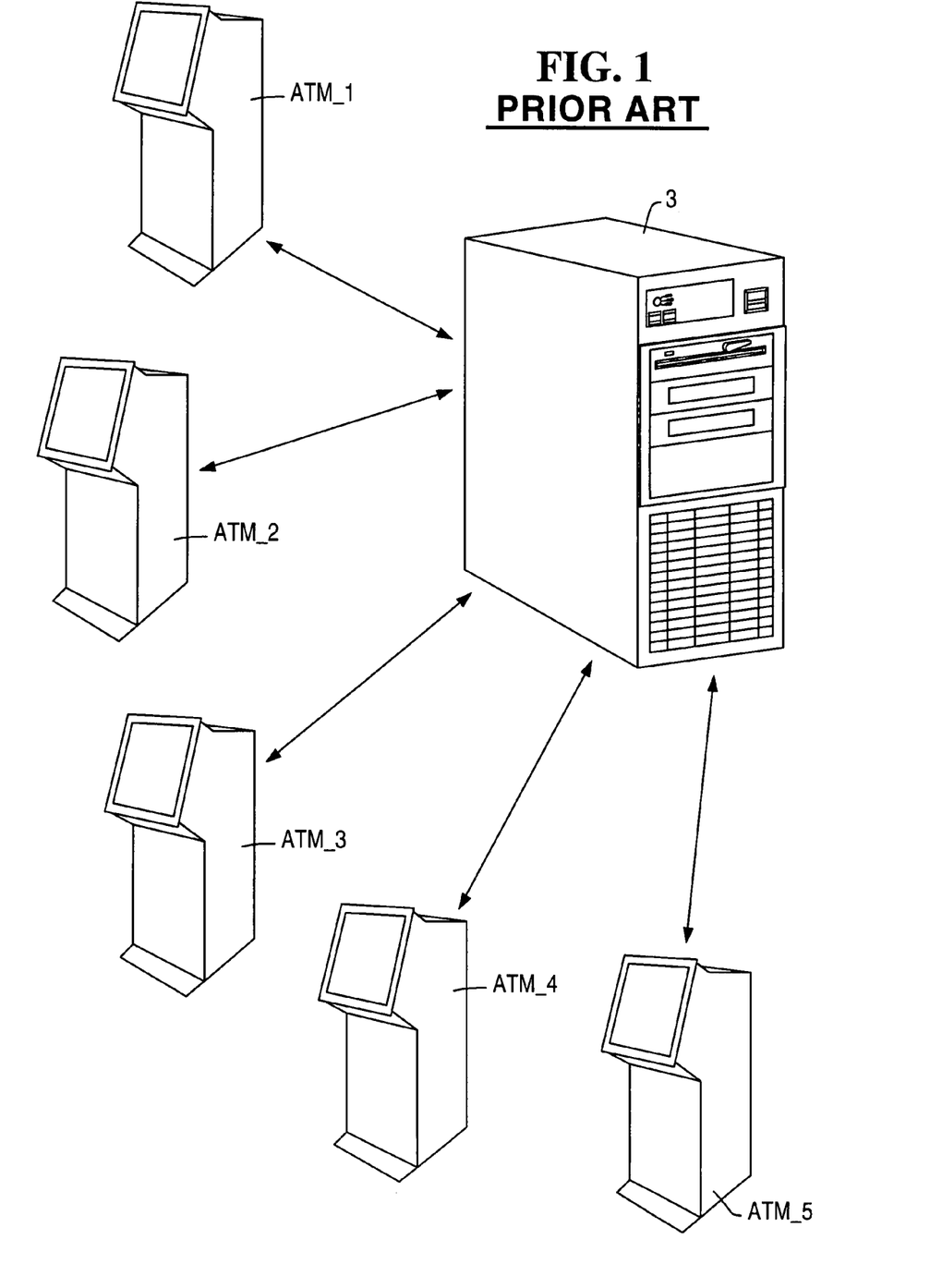
FIG. 1 illustrates a server 3 which controls a group of ATMs.

FIG. 1 illustrates a group of ATMs. The group of ATMs communicates with a server 3 (called a "switch"), which controls their operations, as by granting permission to dispense cash. For example, if a customer (not shown) requests a cash withdrawal from ATM_3, that ATM contacts server 3 to inquire whether the customer's bank balance will cover the withdrawal.

If server 3 is operated by the bank which holds the customer's account, server 3 can answer the inquiry directly. If another bank holds the account, server 3 contacts another server (not shown), to obtain the account information.

After server 3 obtains the account information, server 3 accepts or denies the request, and instructs ATM_3 accordingly. If the request is accepted, ATM_3 dispenses currency to the customer.

Eventually, the currency supply of each ATM will become depleted, and must be replenished. Numerous approaches are possible to accomplish the replenishment. Many approaches require a service person or team equipped with a supply of currency to (1) visit each ATM, (2) examine the ATM's stock of currency, (3) make a determination as to whether replenishment is required, and (4) replenish the appropriate denominations.

Then, after replenishing the ATMs, the technician reports to the server 3 the amounts of currency replenished, so that the server 3 knows how much currency is contained in each ATM.

It has been found that, in this reporting procedure, mistakes are occasionally made. While the mistakes are not frequent, the amounts of currency involved are so large that even infrequent mistakes can be costly.

OBJECTS OF THE INVENTION

An object of the invention is to provide an improved system for managing ATMs.

A further object of the invention is to provide an improved system for managing the cash position of ATMs, and an improved approach for service teams which replenish the ATMs.

A further object of the invention is to provide a system for replenishing currency in ATMs, wherein reporting requirements by technicians who perform the replenishment are reduced, or eliminated.

SUMMARY OF THE INVENTION

In one form of the invention, the decision of whether to replenish the stock of currency in an ATM is based on a prediction of the size of the stock, rather than an actual count of the stock. The prediction is made based on various factors, such as (1) the number of days since the previous replenishment, (2) the average amount of cash dispensed by the ATM per day, (3) ATM dispensing patterns, such as daily variations, variations over pay cycles of customers, variations over seasons, or (4) any combination of the preceding.

DETAILED DESCRIPTION OF THE INVENTION

Figure 2:
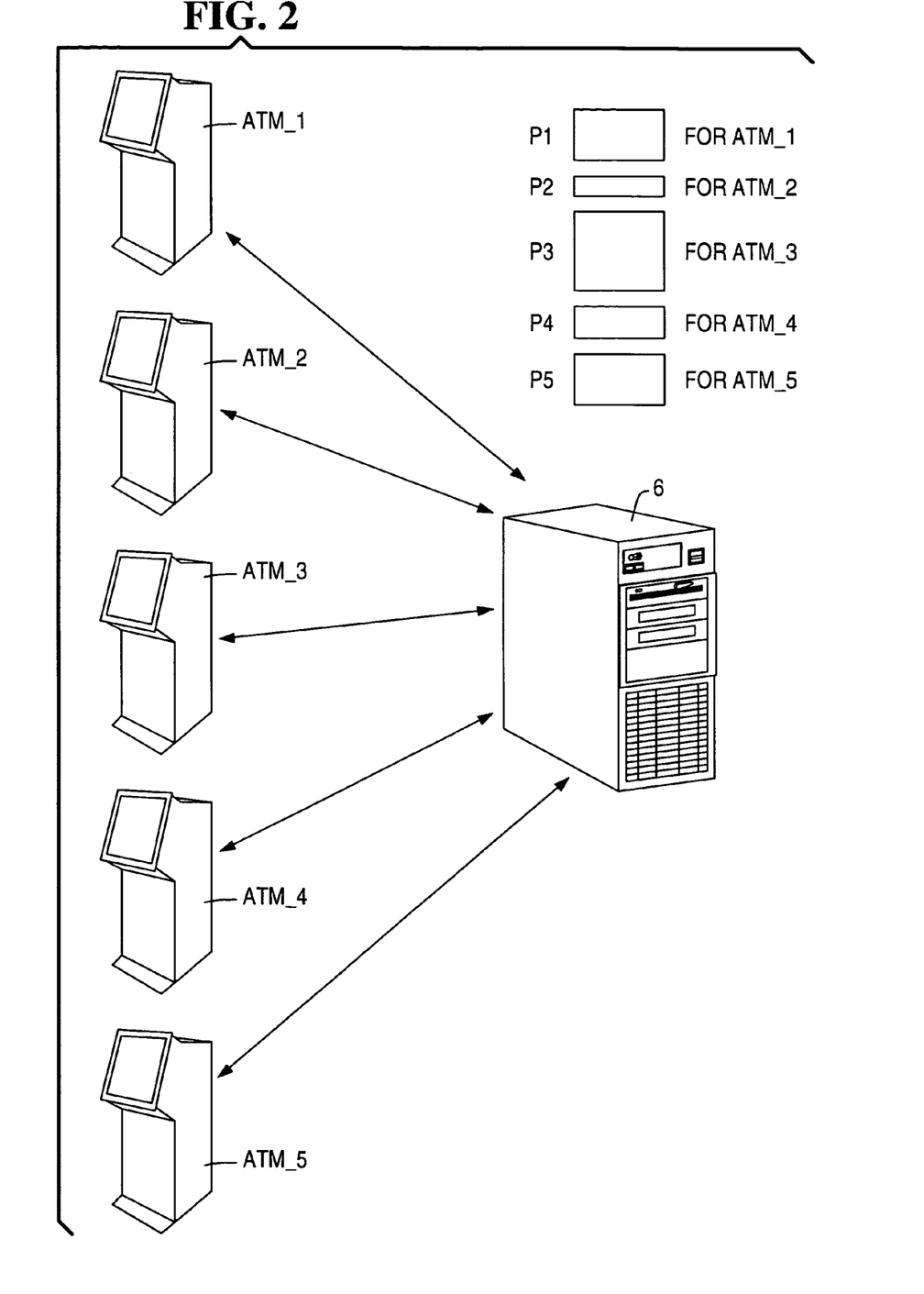
FIG. 2 illustrates one form of the invention, wherein a server 6 computes amounts of currency, indicated by packets P1-P5, to be delivered to each ATM.

FIG. 2 illustrates a switch 6, and five ATMs which it controls. On a daily basis, or at any other convenient period, the switch 6 predicts, or estimates, the amount of currency contained within each ATM. Numerous different approaches to making the predictions are possible.

For example, the amount of currency dispensed at each ATM can be tracked historically. The amounts dispensed will vary from day to day, but the variance will be expected to lie within known limits.

The prediction can predict the total cash stock of the ATM, or can predict the individual stocks of each denomination, such as five-dollar bills, ten-dollar bills, and so on.

After a suitable historical record is collected, the amount dispensed on a given day can be predicted, based on the amounts dispensed on previous similar days. For instance, the amounts dispensed on December 24 (Christmas Eve in the United States) can be expected to be somewhat similar to the amounts dispensed on previous Christmas Eves, and probably less than the amounts dispensed on January 1.

Since (1) the amounts of currency dispensed by each ATM are known through the predictions, and (2) the amounts of currency previously supplied to the ATMs are known, then the amounts of currency physically present within the ATMs at any given time can be estimated.

The server 6 predicts the present supplies of currency. When the predictions indicates that a given ATM should be replenished, the ATM is scheduled for replenishment. In addition, the server 6 computes the amounts of each denomination of currency required for replenishment for each ATM. These amounts are collectively indicated by the currency packets P1-P5. That is, for example, packet P1 indicates a given number of five-dollar bills, a given number of ten-dollar bills, and so on.

A parcel, indicated a dashed block P in FIG. 3, and which contains packets P1 through P5, is given to a technician (not shown). The technician transports the parcel P to each ATM.

Figure 3A:
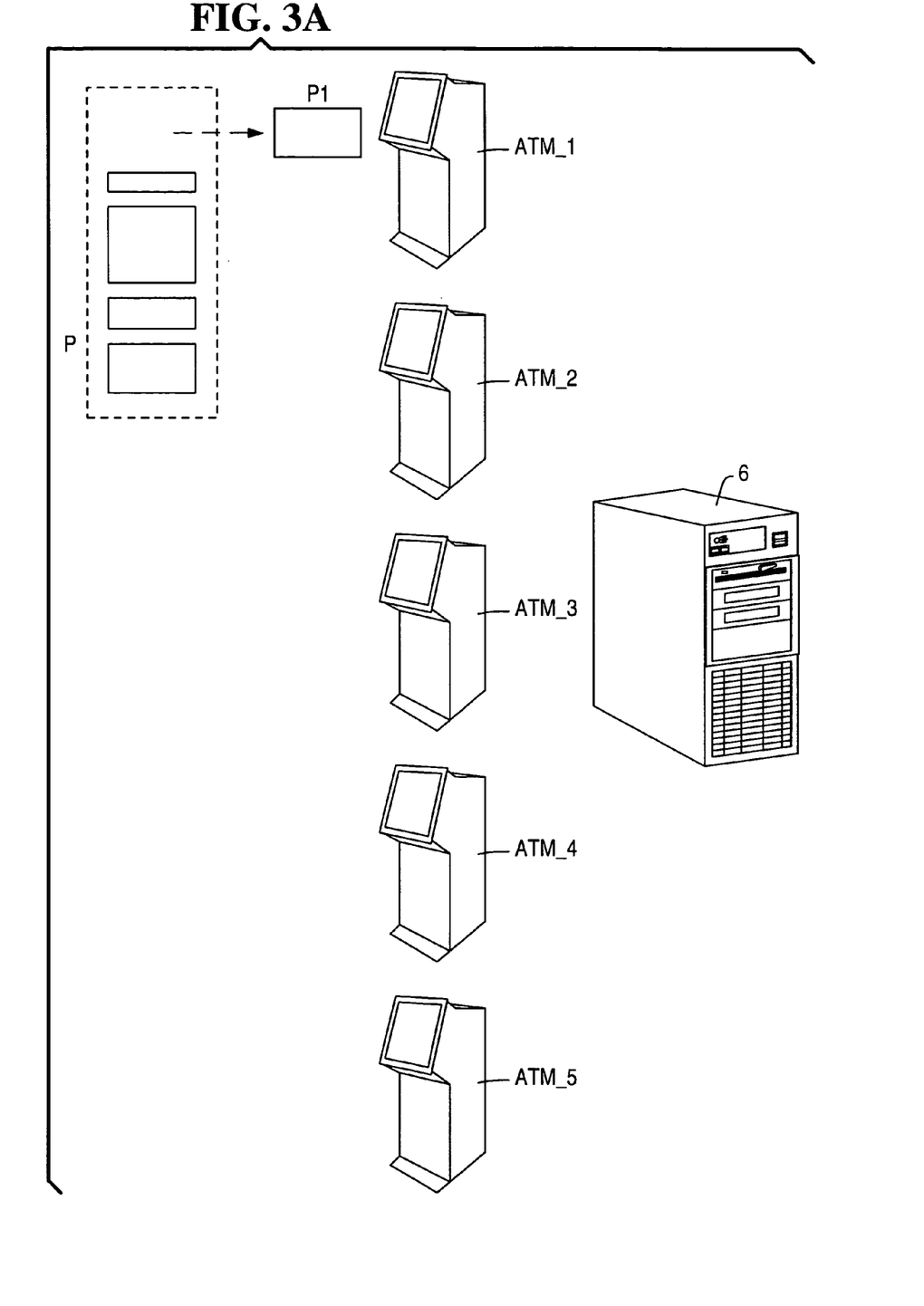
FIG. 3 illustrates a sequence of steps, wherein a parcel of packets is carried to each of several ATMs, and packet of currency from the parcel is delivered to each ATM.
Figure 3B:
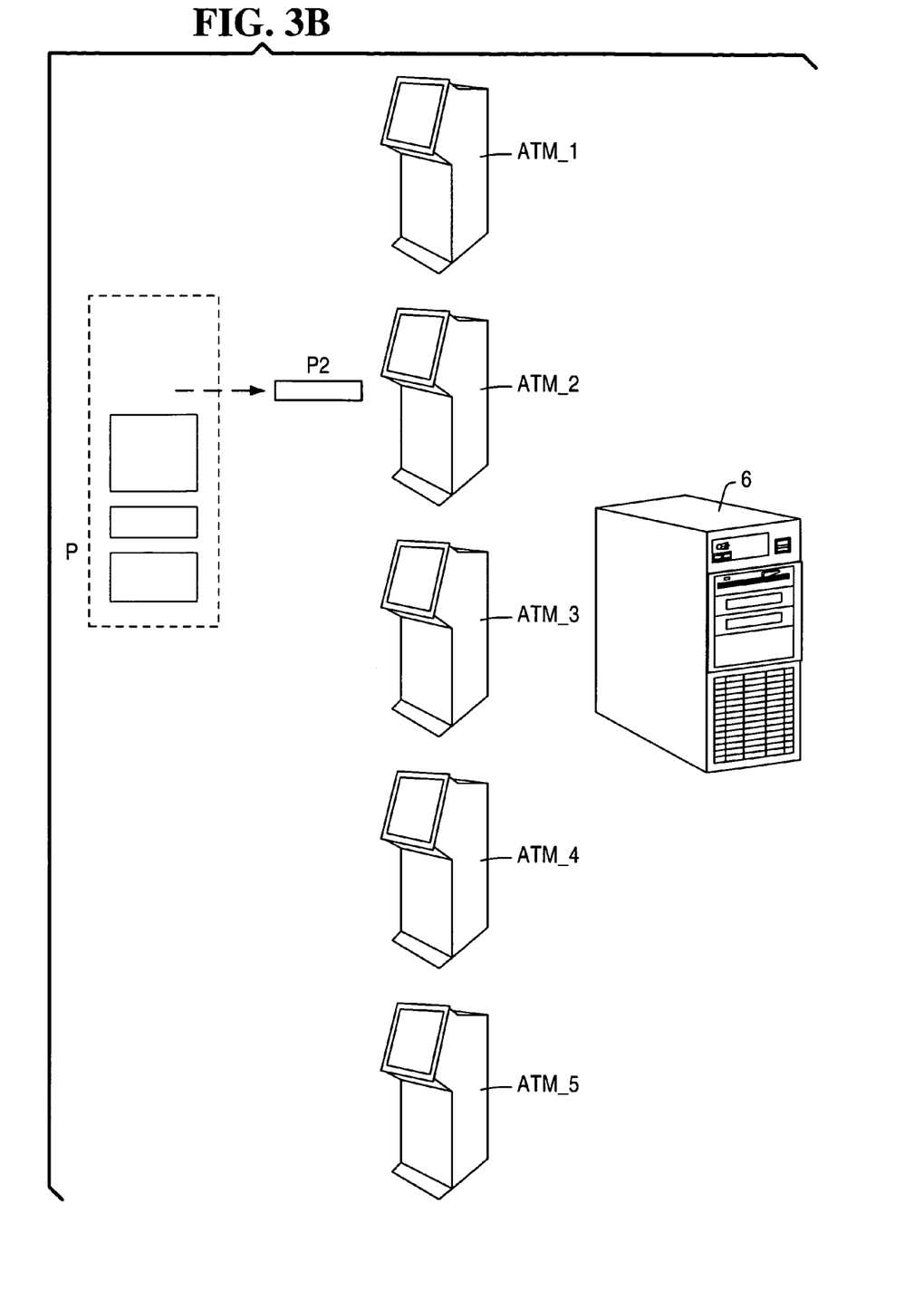
Figure 3C:
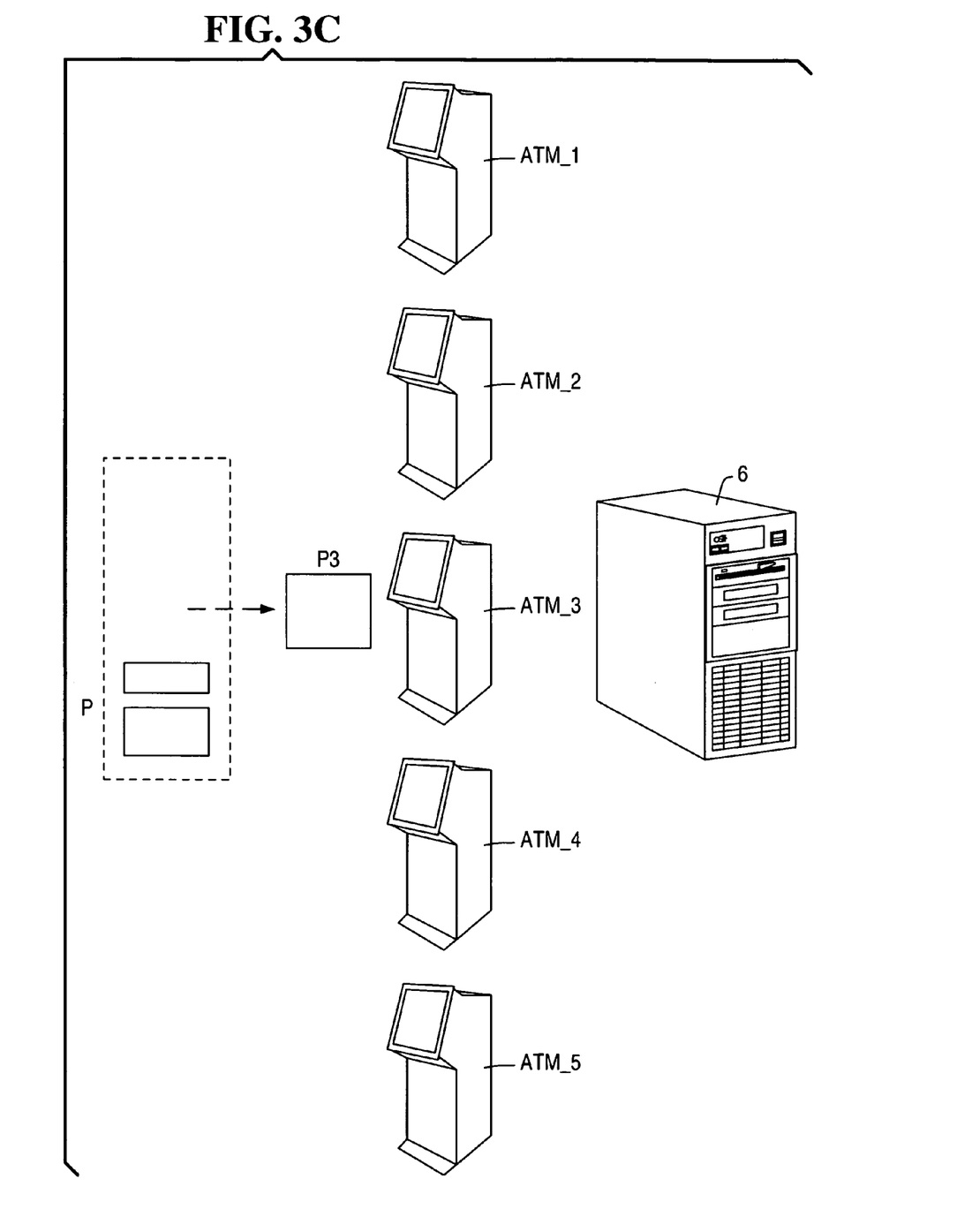
Figure 3D:
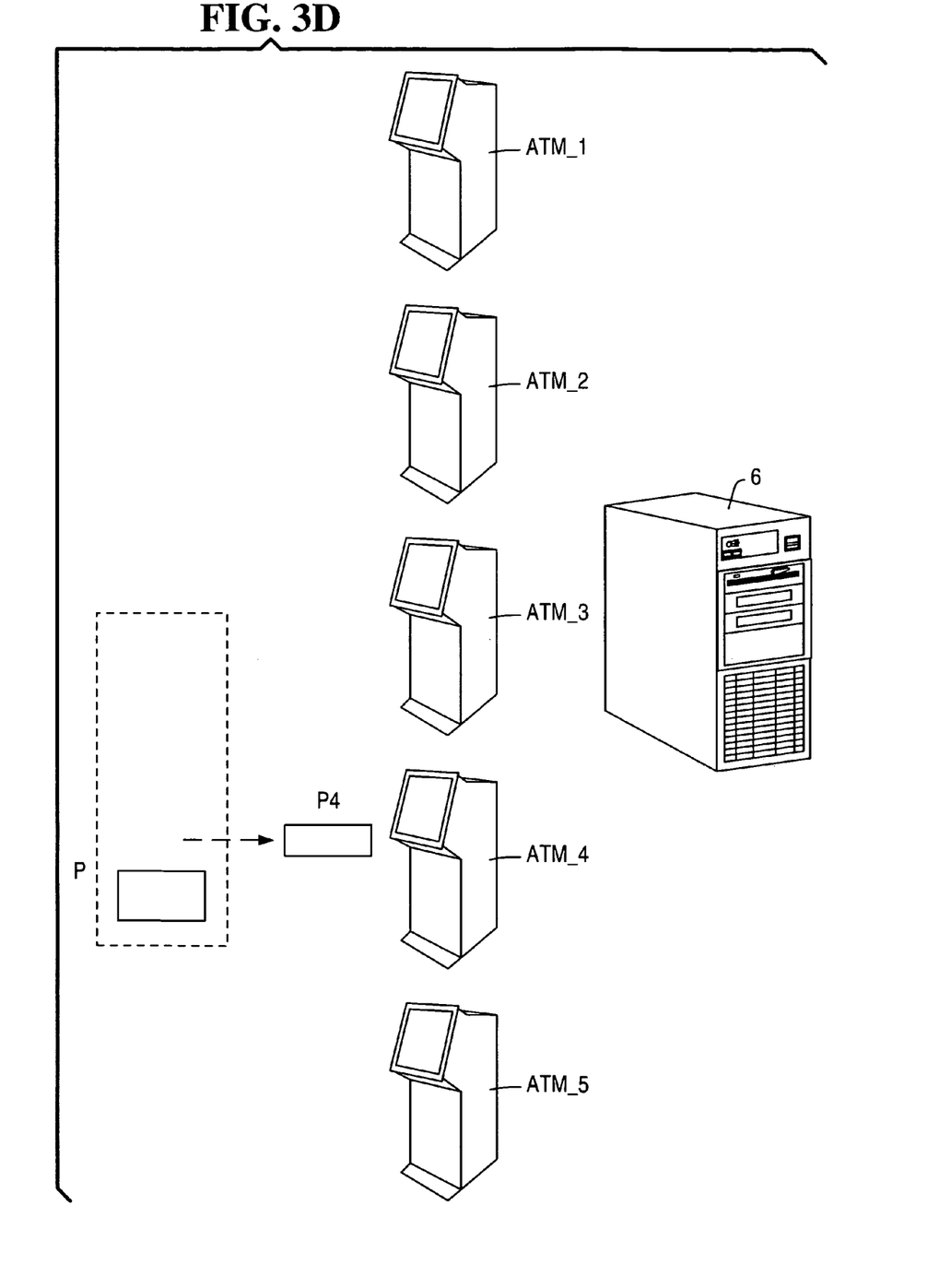
Figure 3E:
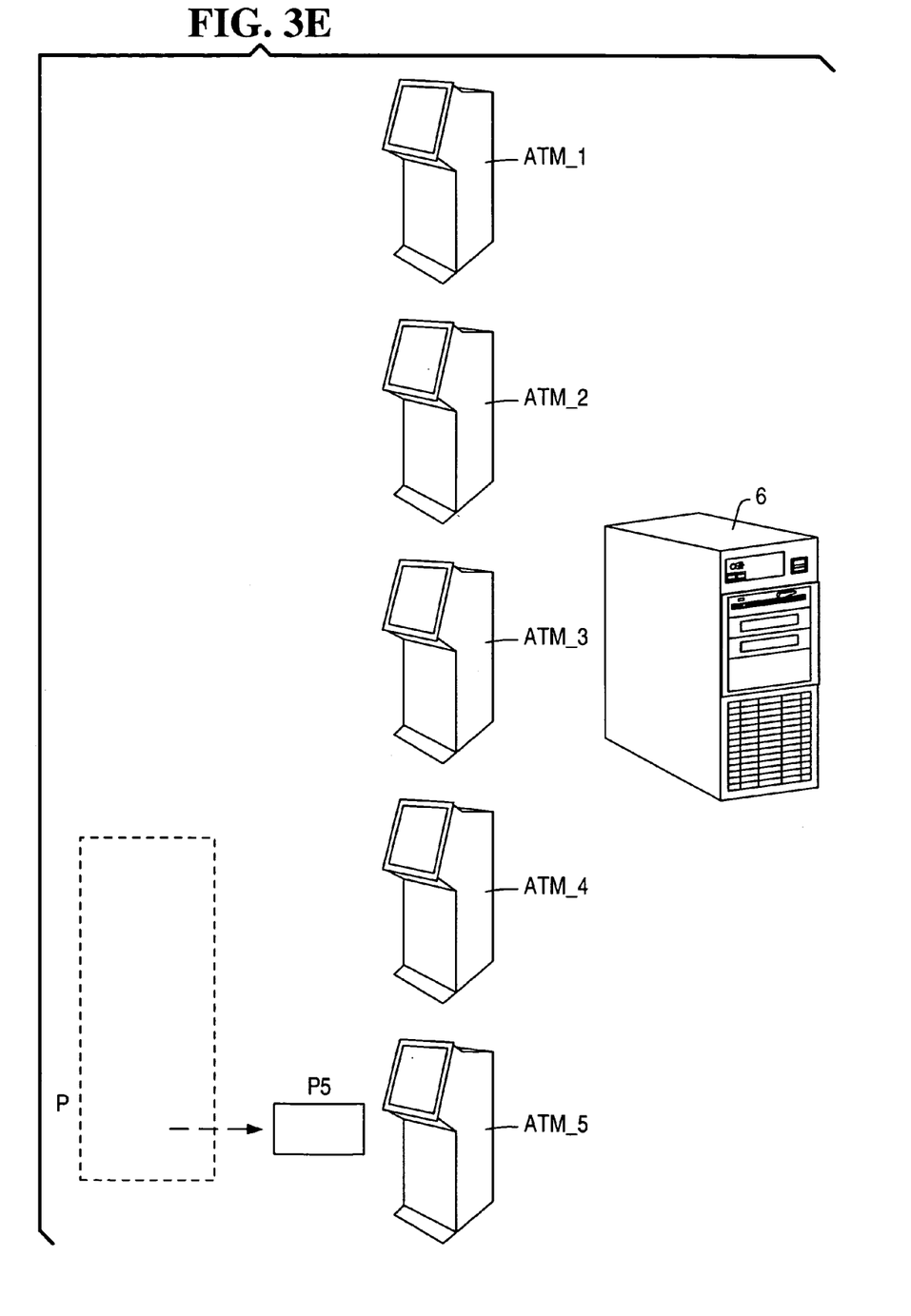

As indicated in FIG. 3A, the technician delivers packet P1 to ATM_1. As indicated in FIG. 3B, the technician delivers packet P2 to ATM_2. As indicated in FIG. 3C, the technician delivers packet P3 to ATM_3. As indicated in FIG. 3D, the technician delivers packet P4 to ATM_4. As indicated in FIG. 3E, the technician delivers packet P5 to ATM_5.

During these delivery steps, the technician physically loads the currency into the storage cassettes (not shown) within the ATM. Alternately, the packets P1-P5 can take the form of pre-loaded cassettes, which replace the existing cassettes within the ATM.

During the delivery to a given ATM, the ATM is taken out-of-service, as known in the art, as by placing the ATM in a supervisory mode, or supply mode. This out-of-service event is reported to the server 6, through the normal communication channels used by the ATM to communicate with the server. That is, when the technician de-activates the ATM, so that it does not, or cannot, respond to customer requests, the ATM reports that fact to the server 6. Later, the technician will re-activate the ATM, and the re-activation will be reported to server 6.

Some ATMs, at this time, report to a central location the fact that cassettes have been removed and replaced.

Based on either, or both, of the activation- and re-activation signals, the server 6 infers that the technician has replenished the ATM with the computed amount of currency. That is, in the case of ATM_1 in FIG. 3, server 6 infers that the packet P1 was delivered to, and installed within, ATM_1. Server 6 now has a new baseline stock of currency within ATM_1 from which to base its future predictions, and it updates its memory of the stock within ATM_1 accordingly.

Significant Features

1. In one form of the invention, a data record is created which records the arrival time and departure time of the service team at each ATM. For example, the computer at the ATM knows when (1) it is taken out-of-service and placed in supervisory mode, and (2) returned to service. It is programmed to record the times of those events, and to report that record to an appropriate central computer, such as server 6, or one located at the financial institution owning the ATM. These records are then sorted according to service team.

The management organization of the service teams can then evaluate the performance of each service team, in terms of, for example, total number of ATMs serviced by each team in a given day and the time required for each ATM.

2. In one form of the invention, the technician does not directly inform the server 6 of the fact of replenishment, nor of the amounts of replenishment, for any ATM. The server 6 infers, from the de-activation/re-activation sequence of the ATM, that the replenishment occurred. More generally, the server 6 infers replenishment of an ATM from signals received which indicate that the technician has gained access to the ATM.

Alternately, other signals transmitted to the server 6 can indicate that the technician has gained access to the ATM. For example, many ATMs are contained within locked rooms. Known apparatus can monitor the door of the room, and issue a signal to server 6, when the door is opened.

Therefore, in the general case, the server 6 receives signals indicating that (1) the room containing the ATM has been entered, (2) the ATM has been de-activated, (3) the currency cassettes within the ATM have been removed, or (4) a person, other than a customer in the normal course of business, is performing some operation on the ATM. One, or a combination, of these signals is received, and the server 6 infers from the signals that an intrusion into the ATM has occurred.

The server 6 maintains a schedule of the ATMs to be replenished on a given day. If the aforementioned intrusion signals emanate from one of the scheduled ATMs, the server 6 infers that the ATM is being replenished, as scheduled. However, if the signals emanate from an ATM which is not scheduled for replenishment, the server 6 infers that unusual activity is occurring at that ATM, and notifies the appropriate authorities, such as the owner of the ATM or law enforcement authorities, or both.

Of course, in another embodiment, the technician can actively and directly inform server 6 of the replenishment event, and the amounts replenished. For example, the technician can (1) call the server 6 by telephone, (2) enter a code identifying the ATM just replenished, and (3) enter another code indicating the amounts of replenishment for each denomination of currency. However, because this active involvement requires transfers of multiple amounts of information, it is preferably avoided, because of the likelihood of error.

3. The server 6 obtains a near real-time report of the fact of replenishment. This provides an advantage over many presently used approaches, wherein technicians replenish multiple ATMs on a given day, and then report the replenishments en masse at the end of the day, or even later. Clearly, delays of several hours, or more, occur in these approaches.

Further, the prior-art involvement of the technicians in making the reports increases the possibility of human error. Further still, in some cases, the technicians do not report directly to server 6, but to an intermediary, such as a computer technician who deals with server 6, or a computer technician who deals with a different server entirely, and the latter server deals with server 6. The involvement of the intermediaries further increases the possibility of error.

4. Under one form of the invention, for extended periods of time, no actual inventory of the currency contained within the ATMs is taken. Instead, the estimates, or predictions, are used to estimate the currency content of an ATM, and schedule replenishment of the currency, if the estimate indicates the content to be low.

Then, the estimate of the currency content of a given ATM is revised when (1) replenishment is scheduled and (2) the signals from the ATM indicate that replenishment occurred. The revised estimate is then used as a baseline for scheduling the next replenishment, based on a predicted rate of depletion.

To repeat:
(1) The cash stock within an ATM is estimated, without counting the cash stock;
(2) Based on the estimate, (i) a determination is made of whether to replenish the cash stock, and (ii) a replenishment amount is computed;
(3) An inference of whether the replenishment has actually occurred is made, based on intrusion signals, and without communication with a technician who performed the replenishment;
(4) The estimate of the cash stock in paragraph (1) is revised upward, by the replenishment amount; and
(5) The system tracks the performance of the service teams.

The extended periods of time can include the following: one week, one month, three months, six months, and one year. Thus, for example, a given financial institution may operate five ATMs. For any selected one of the periods just identified, no inventory of the currency contained within any ATM is taken. Only the estimates, and their revisions, are used to control the replenishment operations.

4. The actual packets P1-P5 in FIG. 2 need not be given to the couriers who replenish the ATMs. Instead, the numerical amounts computed for the ATMs can be given to the couriers, and the couriers themselves can handle counting, and packaging, the currency into packets P1-P5.

5. It may be thought that server 3 in FIG. 1, or a system to which server 3 is connected, already knows the amounts of currency stored in the ATMs, since server 3 gives permission to the ATMs to dispense cash. However, it has been found that practice does not always follow theory. Many times the balance computed for the ATMs, based on the cash transactions recorded by server 3, do not agree with the actual cash contents of the ATMs.

Further, even if server 3 did contain an accurate record of the cash positions of the ATMs, various practical problems interpose themselves, and make usage of those records difficult. For example, the Organization A which replenishes the currency in the ATMs is frequently, if not always, different from the Organization B which maintains server 3. These different organizations occupy physically different places-of-business. Consequently, security considerations make it difficult for Organization A to gain access to server 3, which is in the custody of Organization B. That is, gaining access to server 3 is not a simple matter of transmitting a telephone message to server 3. Since server 3 contains highly sensitive banking and financial records, numerous layers of protection are imposed, to block access by hackers.

Thus, as a practical matter, Organization A does not have access to the computed currency reserves within the ATMs, which server 3 computes. Under the invention, Organization A utilizes server 6 in FIG. 2 to make the estimates described herein. Server 6 is different from server 3 in FIG. 1.

Flow Chart

Figure 4:
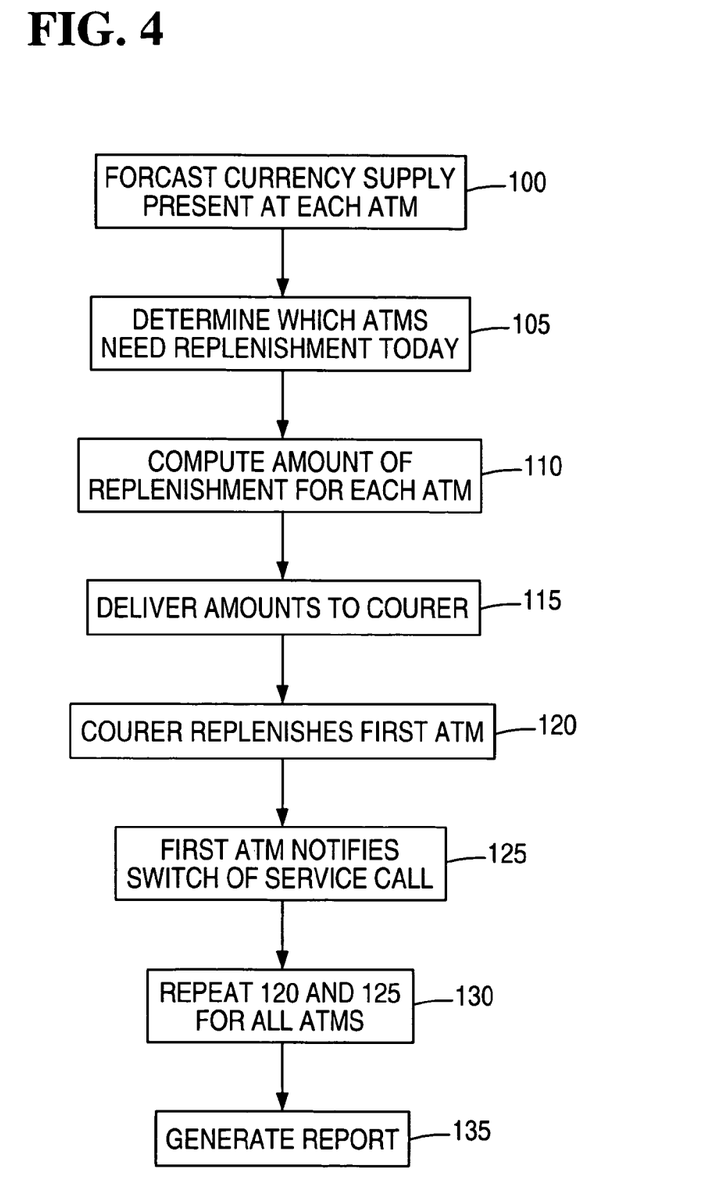
FIG. 4 is a flow chart illustrating logic implemented by one form of the invention.

FIG. 4 indicates steps undertaken by one form of the invention. Many of these steps are computational, and are conveniently performed on a computer. However, depending on circumstances, the computation can be performed manually in some cases.

In block 100, a forecast is made of the currency present at each of several ATMs. The forecasting can be undertaken by the switch 6 in FIG. 2. The forecasting predicts not only the total monetary amount of the currency present in the ATMs, but also the total amount of each denomination.

For example, in the United States, ATMs commonly dispense denominations of $5.00, $10.00, and $20.00. For such an ATM, an estimate is made of the quantity of each denomination present.

Block 105 indicates that a determination is made as to which ATMs need replenishment. For example, a simple determination would involve a two-fold inquiry. One, every ATM is required to maintain a given minimum of total currency, such as $20,000. Two, every ATM is required to maintain a given minimum of specific denominations. For instance, every ATM may be required to maintain a minimum of X five-dollar bills, Y ten-dollar bills, and Z twenty-dollar bills. Any of X, Y, or Z may be zero in certain cases. Any ATM which is predicted to fall below a minimum is scheduled for replenishment.

In a more complex example, different ATMs may be assigned different minimums. For instance, an ATM at a busy location may be depleted every day of its stock of currency, while another ATM, at a remote location, may become depleted less often. The former may be assigned larger minimum requirements than the latter.

In block 110, a computation is made of the amount of each denomination to be replenished at each ATM. These can be called replenishment amounts. For example, ATM_1 in FIG. 2 may be assigned the following amounts: A five-dollar bills, B ten-dollar bills, and C twenty-dollar bills. Another assignation is made for ATM_2, and so on. This computation produces the packets P1-P5 schematically shown in FIG. 2. Each packet represents a collection of specific amounts of each denomination, such as the A five-dollar bills, B ten-dollar bills, and C twenty-dollar bills just discussed.

In block 115 in FIG. 4, the packets P1-P5 are delivered to a technician, or courier. The courier then plans a route which encounters all the ATMs which are to be replenished. Alternately, a computer, such as server 6 in FIG. 2, can map out a shortest route, as by using the "Travelling Salesman Algorithm," which is well known in network theory, and deliver the route to the courier.

It is emphasized that the Figures show simplified, schematic, systems. The five ATMs shown are representative of a multiplicity of ATMs. The five packets P1-P5 are representative of a multiplicity of packets. The fact that five packets, and five ATMs, are shown is coincidental. There is no requirement that the number of packets computed equal the number of ATMs controlled by the server 6, because, in general, not all ATMs will be replenished on the same day.

In block 120, the courier replenishes the first ATM listed on the route. In block 125, the ATM notifies the server 6 that someone has entered the ATM. As discussed above, server 6 infers that this event indicates that replenishment occurred, if that inference is proper. Otherwise, as stated above, server 6 notifies the authorities.

Block 130 indicates that the steps of blocks 120 and 125 are repeated for the other ATMs. That is, the courier replenishes the remaining ATMs on the route, and they inform server 6 of the replenishment.

Block 135 indicates that a report is generated. This is typically done at the end of the day, after it is assumed that the couriers have finished their routes. A computer, such as server 6, lists all ATMs which indicate that they have been visited, in chronological order of the visits. The chronological order is known because (1) the time-of-arrival of the signals issued by the ATMs is known to server 6, and (2) server 6 is in possession of an internal clock and calendar, which indicates the date and time of the arrival of the signals.

The computer also lists the ATMs scheduled for service that day, and the currency amounts to be replenished. These three lists (ATMs actually visited, ATMs scheduled to be visited, and replenishment amounts) are stored, and delivered to management personnel, as by display on a computer terminal, or printing on paper.

It is emphasized that, in the steps of FIG. 4, at no time did the courier, who performed the replenishment, make any direct report of the replenishment activities. The courier did not contact server 6, or any other agency, as each ATM was replenished. Nor did the courier "check in" at the end of the day, and present confirmation of which ATMs had been replenished.

Rather, the signals issued by the ATMs, such as the de-activation signals, tampering signals, or intrusion signals, are used to infer the replenishment of each ATM.

ADDITIONAL EMBODIMENT

Figure 5A:
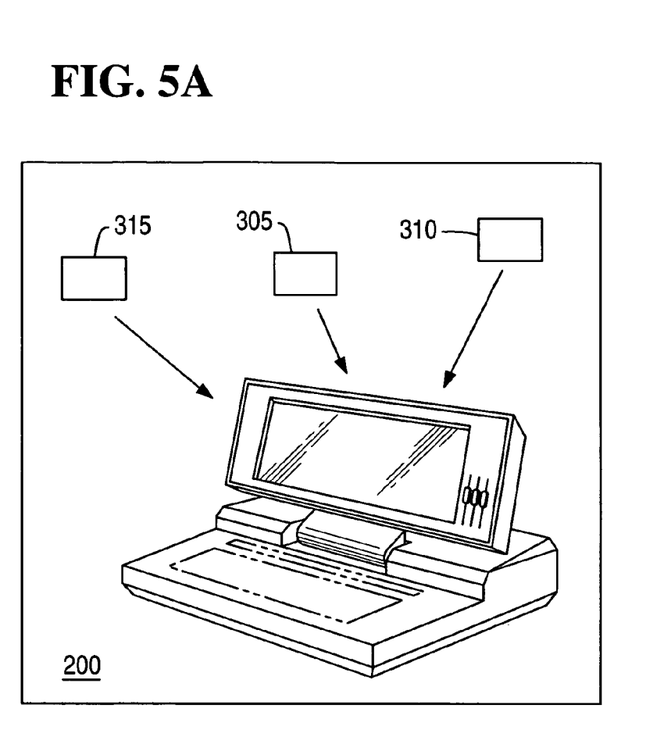
FIGS. 5 and 5A illustrate one form of the invention.
Figure 5B:
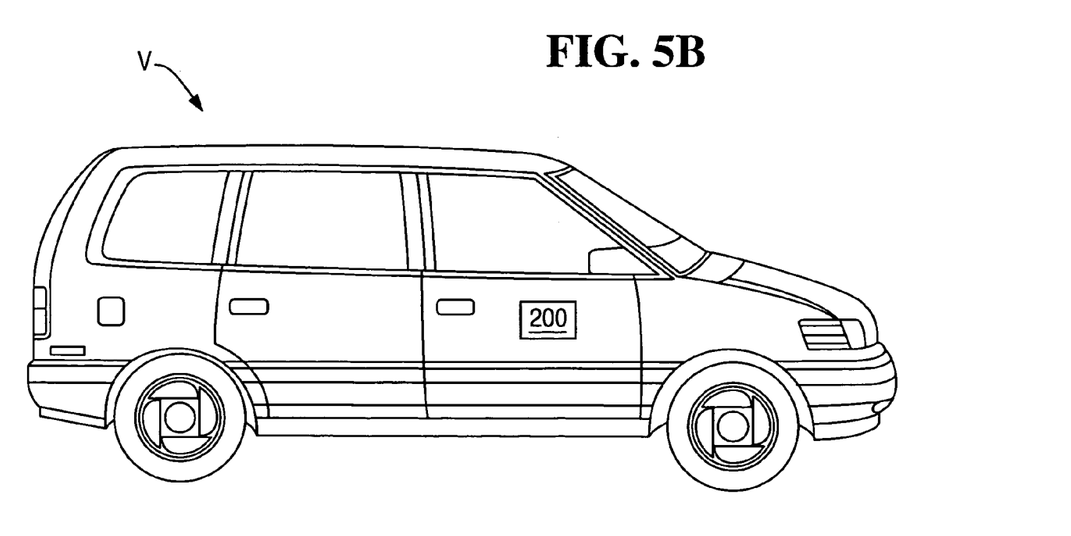

FIG. 5 illustrates another form of the invention. The courier (not shown) who replenishes the ATMs drives van V. A package 200, which accompanies the courier, is shown, and FIG. 5A illustrates the contents of the package.

The package is equipped with portable computer 300. The computer 300 is equipped with a global positioning system (GPS) card 305, which computes the exact latitude and longitude of the van V, or of the courier if the courier removes the package 200 from the van V.

Software 310, which utilizes a cellular modem 315, contacts server 6 of FIG. 2, and reports the location of the van V in FIG. 5. This contact can be (1) made periodically, (2) actively triggered by the courier, or (3) induced by software which monitors the latitude/longitude coordinates. For example, if those coordinates fail to change for a predetermined time, such as five minutes, the software infers that the van is stationary, and reports that fact to server 6.

Based on these reports, server 6 tracks the location of the courier. When the courier comes into proximity of an ATM scheduled to be serviced, server 6 can use that information to infer that replenishment has occurred.

It is preferred that the indication of proximity of the courier to an ATM be used in conjunction with the intrusion signals described above. For example, if an ATM issues signals which indicate that it is being serviced, and if the latitude/longitude coordinates of the courier indicate that the courier is in the vicinity of the ATM (such as within 50 feet), server 6 concludes that the ATM is being replenished as scheduled, as opposed to being burglarized. The server 6 takes the steps identified previously, such as updating the computed amounts of currency within the ATM serviced.

All of the components shown in FIG. 5A, with the exception of the software 310, are commercially available. The general steps taken by software 310 are described above.

Numerous substitutions and modifications can be undertaken without departing from the true spirit and scope of the invention. What is desired to be secured by Letters Patent is the invention as defined in the following claims.

What is claimed is:

1. In connection with operation of a system of ATMs, each of which contains at least one computer, a method comprising the following steps:
   a) identifying low-stocked ATMs, which require replenishment of currency;
   b) causing replenishment of currency in low-stocked ATMs to occur;
   c) receiving replenishment signals from the replenished ATMs; and
   d) using the replenishment signals, and without using communications from parties performing the replenishment, preparing one, or more, reports concerning the ATMs replenished.

2. Method according to claim 1, wherein each replenishment signal is generated by a computer within an ATM.

3. Method according to claim 2, wherein the replenishment signals indicate contact with an ATM by a party other than a customer in the normal course of business.

4. Method according to claim 3, wherein entry into an ATM by a burglar causes a replenishment signal to occur.

5. Method according to claim 1, wherein the identifying process of paragraph (a) is performed by a system remote from the ATMs, without presence of a human at the ATMs.

6. In the operation of a system of ATMs, a method comprising:
   a) maintaining a security system within each ATM, which
      i) detects entry into the ATM, and
      ii) issues an entry signal in response; and
   b) scheduling replenishment of a group of ATMs during a time period; and
   c) when entry signals are received from ATMs within the group, during the time period, designating the corresponding ATMs as having been replenished in currency.

7. A method of replenishing a plurality of ATMs, comprising the following steps:
   a) for each ATM, making an estimate of the amount of currency stored therein, without measuring the currency presently stored;
   b) using the estimates, identifying a subset of ATMs to be re-stocked with currency;
   c) for each ATM in the subset, preparing a packet of currency;
   d) transferring the packets to a courier;
   e) receiving one, or more, signals from each ATM, which indicate interaction with the ATM by a party other than a customer;
   f) recording
      i) the times of receipt of the signals, and
      ii) the identities of the ATMs issuing the respective signals; and
   g) ascertaining whether the signals were issued by an ATM within the subset and
      i) if not, contacting a law enforcement agency;
      ii) if so, adjusting the estimate of the currency stored within that ATM.

8. Method according to claim 7, wherein no person directly reports replenishment currency supply of any ATM.

9. Method according to claim 8, wherein no communications, made by parties performing the replenishment, are utilized in preparing said report.

* * * * *